US012118085B2

(12) United States Patent
Shrestha et al.

(10) Patent No.: US 12,118,085 B2
(45) Date of Patent: Oct. 15, 2024

(54) SYSTEMS AND METHODS FOR MACHINE LEARNING ENHANCED INTELLIGENT BUILDING ACCESS ENDPOINT SECURITY MONITORING AND MANAGEMENT

(71) Applicant: Ambient AI, Inc., San Jose, CA (US)

(72) Inventors: Shikhar Shrestha, San Jose, CA (US); Vikesh Khanna, San Jose, CA (US); James Douglas Connor, San Jose, CA (US)

(73) Assignee: Ambient AI, Inc., San Jose, CA (US)

( * ) Notice: Subject to any disclaimer, the term of this patent is extended or adjusted under 35 U.S.C. 154(b) by 0 days.

(21) Appl. No.: 18/370,523

(22) Filed: Sep. 20, 2023

(65) Prior Publication Data

US 2024/0012905 A1   Jan. 11, 2024

Related U.S. Application Data

(63) Continuation of application No. 18/171,370, filed on Feb. 19, 2023, now Pat. No. 11,861,002, which is a
(Continued)

(51) Int. Cl.
*G06F 21/55* (2013.01)
*G06F 18/21* (2023.01)
(Continued)

(52) U.S. Cl.
CPC ............ *G06F 21/554* (2013.01); *G06F 18/21* (2023.01); *G06F 18/2431* (2023.01);
(Continued)

(58) Field of Classification Search
CPC .... G06K 9/00771; G06K 9/46; G06K 9/6217; G06K 9/628; G06N 20/20; G06N 5/04;
(Continued)

(56) References Cited

U.S. PATENT DOCUMENTS

| 7,777,783 B1 * | 8/2010 | Chin ...................... H04N 23/90 |
| | | 348/211.99 |
| 8,068,986 B1 | 11/2011 | Shahbazi et al. |

(Continued)

FOREIGN PATENT DOCUMENTS

| EP | 3862902 A1 | 8/2021 |
| TW | 200806035 A | 1/2008 |
| TW | 201722136 A | 6/2017 |

OTHER PUBLICATIONS

Agrawal, Prachi , "De-Identification for Privacy Protection in Surveillance Videos", Thesis submitted in partial fulfillment of the requirements for the degree of Master of Science in Electronics and Communication, Center for Visual Information Technology International Institute of Information Technology, Hyderabad, India, Jun. 2010.

(Continued)

*Primary Examiner* — Frank F Huang
(74) *Attorney, Agent, or Firm* — Jeffrey Schox; Diana Lin

(57) ABSTRACT

Systems and methods for correlating access-system primitives generated by an access control system and semantic primitives generated by a sensor data comprehension system.

19 Claims, 8 Drawing Sheets

Related U.S. Application Data continuation of application No. 17/880,476, filed on Aug. 3, 2022, now Pat. No. 11,640,462, which is a continuation of application No. 16/696,682, filed on Nov. 26, 2019, now Pat. No. 11,443,515.

(60) Provisional application No. 62/784,215, filed on Dec. 21, 2018.

(51) Int. Cl.

| | |
|---|---|
| *G06F 18/2431* | (2023.01) |
| *G06F 21/31* | (2013.01) |
| *G06N 5/04* | (2023.01) |
| *G06N 20/20* | (2019.01) |
| *G06V 10/25* | (2022.01) |
| *G06V 10/82* | (2022.01) |
| *G06V 20/40* | (2022.01) |
| *G06V 20/52* | (2022.01) |
| *G06V 30/19* | (2022.01) |
| *G06V 30/262* | (2022.01) |
| *G08B 13/196* | (2006.01) |
| *G08B 29/18* | (2006.01) |
| *H04N 23/90* | (2023.01) |
| *G06Q 50/26* | (2012.01) |
| *G06V 10/00* | (2022.01) |

(52) U.S. Cl.
CPC .............. *G06F 21/31* (2013.01); *G06N 5/04* (2013.01); *G06N 20/20* (2019.01); *G06V 10/25* (2022.01); *G06V 10/82* (2022.01); *G06V 20/41* (2022.01); *G06V 20/52* (2022.01); *G06V 30/19173* (2022.01); *G06V 30/274* (2022.01); *G08B 13/19613* (2013.01); *G08B 29/188* (2013.01); *H04N 23/90* (2023.01); *G06Q 50/265* (2013.01); *G06V 20/44* (2022.01)

(58) Field of Classification Search
CPC . G06F 21/31; G08B 13/19613; G08B 29/188; H04N 5/247; G06Q 50/265
See application file for complete search history.

(56) References Cited

U.S. PATENT DOCUMENTS

| | | | |
|---|---|---|---|
| 8,139,112 B2 | 3/2012 | Cleary et al. | |
| 9,665,777 B2 | 5/2017 | Naikal et al. | |
| 9,746,988 B2 | 8/2017 | Kim et al. | |
| 9,883,165 B2 | 1/2018 | Denizot et al. | |
| 9,961,388 B2* | 5/2018 | Harrison | H04N 21/25858 |
| 10,102,881 B2* | 10/2018 | Elsner | H04L 67/10 |
| 10,297,126 B2 | 5/2019 | Rao | |
| 10,462,674 B2* | 10/2019 | Freda | H04W 16/14 |
| 10,546,197 B2 | 1/2020 | Shrestha et al. | |
| 10,740,992 B2* | 8/2020 | Estill | G07C 9/00309 |
| 10,783,487 B2* | 9/2020 | Estill | G06K 7/1413 |
| 10,937,290 B2 | 3/2021 | Tilkin et al. | |
| 11,195,067 B2 | 12/2021 | Shrestha et al. | |
| 11,443,515 B2 | 9/2022 | Shrestha et al. | |
| 2004/0119819 A1 | 6/2004 | Aggarwal et al. | |
| 2004/0242266 A1* | 12/2004 | Tagliabue | H04M 1/72439 455/556.1 |
| 2005/0068171 A1 | 3/2005 | Kelliher et al. | |
| 2006/0090141 A1* | 4/2006 | Loui | G06F 16/447 715/764 |
| 2006/0093190 A1* | 5/2006 | Cheng | G06K 9/00885 382/115 |
| 2006/0268108 A1 | 11/2006 | Abraham | |
| 2006/0279630 A1 | 12/2006 | Aggarwal et al. | |
| 2009/0210793 A1* | 8/2009 | Yee | G06F 16/58 715/723 |
| 2010/0321183 A1* | 12/2010 | Donovan | G08B 13/19693 340/540 |
| 2011/0164163 A1 | 7/2011 | Bilbrey et al. | |
| 2011/0249867 A1 | 10/2011 | Haas et al. | |
| 2012/0046770 A1* | 2/2012 | Becker | H04N 9/8205 700/94 |
| 2012/0180390 A1* | 7/2012 | Goodman | E06B 9/68 49/13 |
| 2013/0080895 A1* | 3/2013 | Rossman | H04N 21/234381 715/720 |
| 2013/0128050 A1 | 5/2013 | Aghdasi et al. | |
| 2014/0104372 A1* | 4/2014 | Calman | H04N 7/15 348/E7.084 |
| 2014/0347475 A1 | 11/2014 | Divakaran et al. | |
| 2015/0009031 A1 | 1/2015 | Bedros et al. | |
| 2015/0035987 A1* | 2/2015 | Fernandez | H04N 7/186 348/156 |
| 2015/0235379 A1 | 8/2015 | Ogorman et al. | |
| 2015/0269969 A1* | 9/2015 | DeYonker | H04N 21/47 386/241 |
| 2015/0317841 A1* | 11/2015 | Karsch | G06V 20/52 348/149 |
| 2015/0326570 A1* | 11/2015 | Publicover | G06F 3/017 382/117 |
| 2015/0350902 A1* | 12/2015 | Baxley | H04L 63/302 726/7 |
| 2015/0379293 A1* | 12/2015 | Wang | G06F 16/951 726/7 |
| 2015/0379356 A1 | 12/2015 | Nikolova et al. | |
| 2016/0378861 A1 | 12/2016 | Eledath et al. | |
| 2017/0054982 A1 | 2/2017 | Vellore Arumugam et al. | |
| 2017/0308753 A1 | 10/2017 | Wu et al. | |
| 2018/0067593 A1 | 3/2018 | Tiwari et al. | |
| 2018/0219888 A1 | 8/2018 | Apostolopoulos | |
| 2019/0026564 A1 | 1/2019 | Lau et al. | |
| 2019/0087646 A1 | 3/2019 | Goulden et al. | |
| 2020/0013380 A1* | 1/2020 | Kakoyiannis | G06F 16/685 |
| 2020/0098212 A1* | 3/2020 | Kratochvil | E05G 5/02 |
| 2021/0112077 A1 | 4/2021 | Huston et al. | |
| 2023/0185908 A1 | 6/2023 | Khanna et al. | |

OTHER PUBLICATIONS

Boufarguine, Mourand, et al., "Virtu4D: a Real-time Virtualization of Reality", 5th International Symposium 3D Data Processing, Visualization and Transmission, 2010.

Guennoun, Mouhcine, et al., "Augmented Reality-Based Audio/Visual Surveillance System", 2008 IEEE International Workshop on Haptic Audio Visual Environments and Games, IEEE, 2008.

Mori, Shohei, et al., "An Overview of Augmented Visualization: Observing the Real World as Desired", APSIPA Transactions on Signal on Signal and Information Processing 7 (2018).

Sebe, Ismail Oner, et al., "3D Video Surveillance with Augmented Virtual Environments", First ACM SIGMM International Workshop on Video Surveillance. ACM, 2003.

* cited by examiner

SYSTEMS AND METHODS FOR MACHINE LEARNING ENHANCED INTELLIGENT BUILDING ACCESS ENDPOINT SECURITY MONITORING AND MANAGEMENT

CROSS-REFERENCE TO RELATED APPLICATIONS

This application is a continuation of U.S. application Ser. No. 18/171,370 filed 19 Feb. 2023, which is a continuation of U.S. application Ser. No. 17/880,476 filed 3 Aug. 2022, which is a continuation of U.S. patent application Ser. No. 16/696,682 filed 26 Nov. 2019, which claims the benefit of U.S. Provisional Application No. 62/784,215 filed 21 Dec. 2018, each of which is incorporated in its entirety by this reference.

TECHNICAL FIELD

This invention relates to the sensor fusion field, and more specifically to a new and useful machine learning-based site monitoring and security in the access security, machine learning, and sensor fusion fields.

BACKGROUND

Traditional building security may include one or more types of access security systems for monitoring or enabling secure ingress into protected areas of a building. The access security systems that are typically deployed in many building security schemes involve electronic access monitoring and/or management. In electronic access monitoring and/or management deployments, there is usually involved two or three primary security components used in the monitoring and/or management of a standard point of access, such as a doorway, turnstile, and the like. For instance, at an access point within a building that is a doorway, the electronic security access system may include one or more of an electronic lock, an electronic reader, door position circuit, and the like.

While traditional electronic access systems provide a layer of security to access points to or within a building, these traditional electronic access systems may sometimes include faulty access components causing false alerts, may be manipulated or bypassed by malicious actors, and often cannot provide real-time context regarding an alert or an alarm associated with a given access point. Typically, the only context available for an alert or an alarm is related video data. Because of this, administrators of the electronic access security system are typically operating blindly with respect to a legitimacy of alerts produced by the electronic access system and further, may fail to recognize circumstances in which a legitimate security alert should be made in the case of malicious party that is able to unlawfully bypass the system.

Thus, there is a need in the facility security field to create new and useful systems and methods for enhanced access security. The embodiments of the present application provide such new and useful systems and methods.

DESCRIPTION OF THE PREFERRED EMBODIMENTS

The following description of preferred embodiments of the present application are not intended to limit the inventions to these preferred embodiments, but to enable any person skilled in the art of to make and use these inventions.

1. System

Figure 1A:
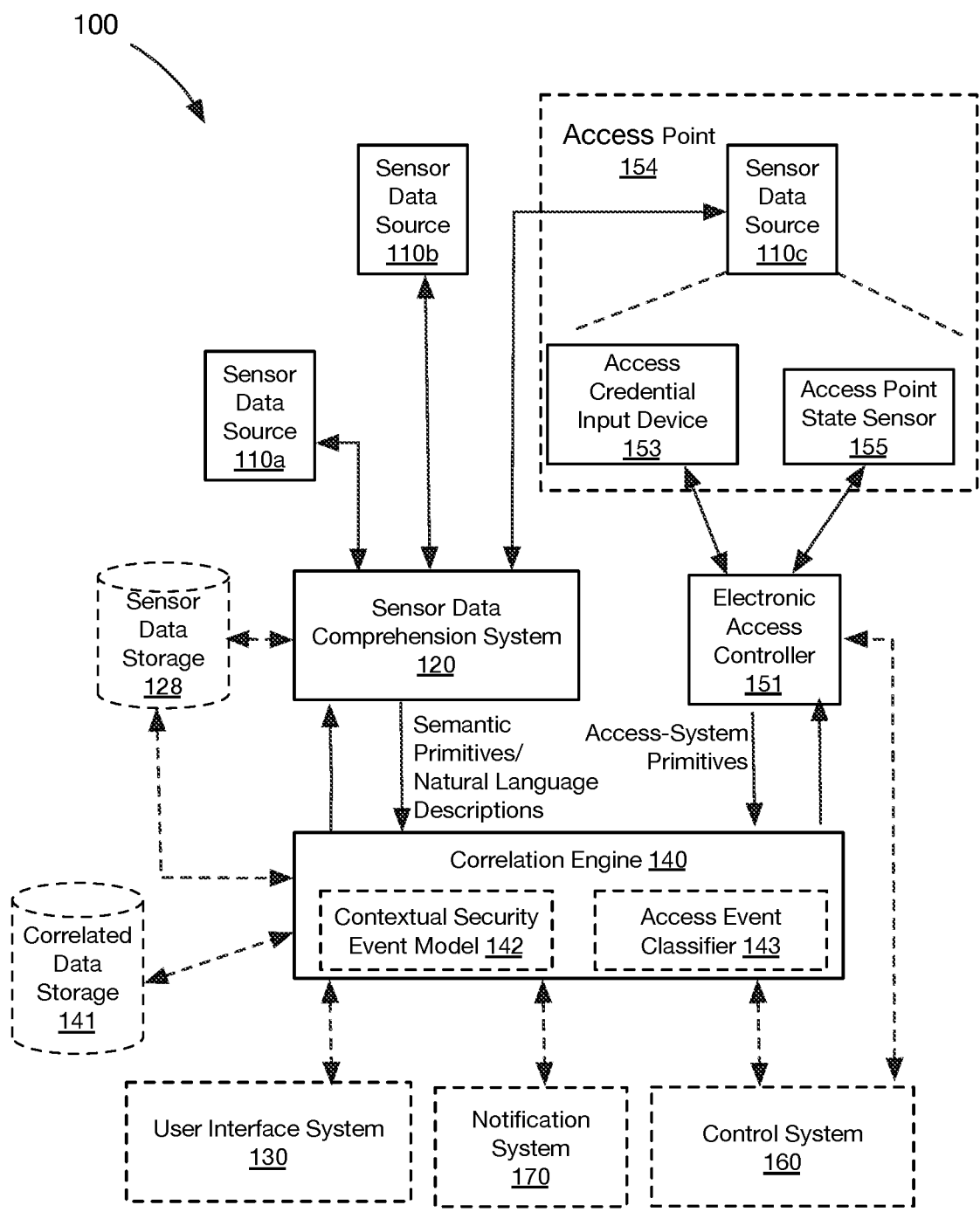
FIGS. 1A-1B illustrate schematics of a system, in accordance with embodiments.

As shown in FIG. 1A, in some variations, a system 100 includes at least one of: sensor data sources (e.g., 110*a-c*) (e.g., image data sources, such as video cameras), a sensor data comprehension system (e.g., 120), sensor data storage (e.g., 128), an electronic access controller (e.g., 151), a correlation engine (e.g., 140), a user interface system (e.g., 130), a control system (e.g., 160), and a notification system (e.g., 170). In some implementations, the correlation engine includes the sensor data comprehension system. In some implementations, the correlation engine includes the electronic access controller. In some implementations, the correlation engine is communicatively coupled to at least one of a sensor data source (e.g., 110*a-c*), an access credential input device (e.g., 153), and an access point state sensor (e.g., 155). In some implementations, the electronic access controller, at least one access credential input device, and at least one access point state sensor form an electronic access system. In some implementations, the electronic access system includes at least one access switch.

In some variations, the sensor data comprehension system 120 is similar to a comprehension system as described in U.S. patent application Ser. No. 16/137,782, filed 21 Sep. 2018, which is incorporated herein in its entirety by this reference. However, the sensor data comprehension system 120 can be any suitable type of comprehension system that functions to perform processes as described herein.

Figure 1B:
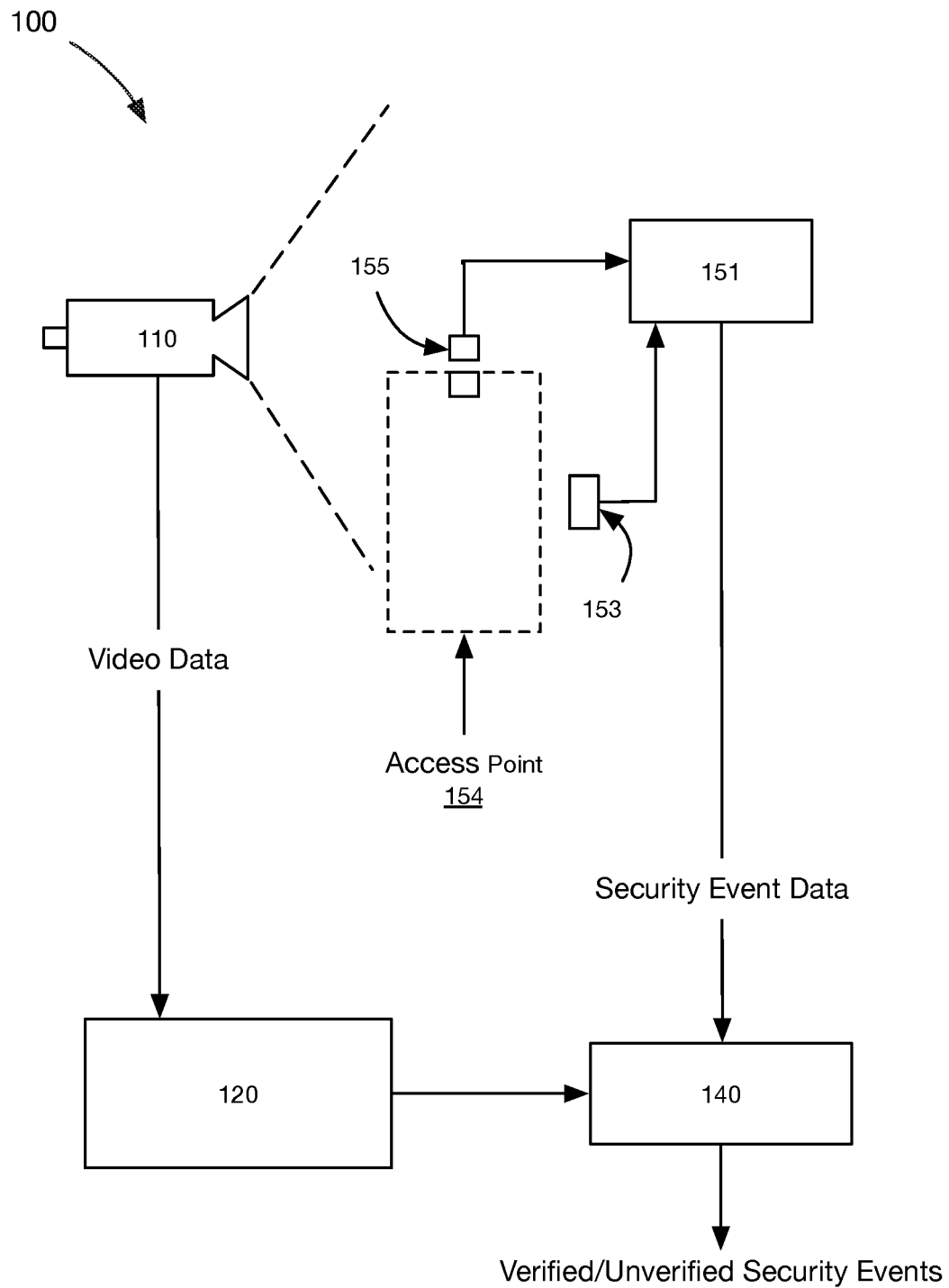

As shown in FIGS. 1A and 1B, in some variations, the system 100 includes at least one of an access credential input device (e.g., 153), and an access point state sensor (e.g., 155).

In some implementations, the electronic access controller 151 is communicatively coupled one or more access credential input devices (e.g., 153). In some implementations, the electronic access controller 151 is communicatively coupled one or more access point state sensors (e.g., 155). For example, a building might have an access credential input device and an access point state sensor at a plurality of building entrances (e.g., 154). In some implementations, the correlation engine 140 is communicatively coupled to at least one electronic access controller. For example, the correlation engine can be communicatively coupled to an electronic access controller for a plurality of buildings (e.g., located within a campus, or located in different geographic locations).

In some implementations, access credential input devices include at least one of an electronic reader, a biometric input device, a face detection system, a fingerprint scanner, a keypad, a voice recognition system, a telephone, an intercom, a credit card reader, a payment processing terminal, a key-fob reader, and the like. In some implementations, electronic readers include at least one of an RFID (Radio Frequency Identification) reader, a magnetic card reader, an NFC (Near Field Communication) receiver, a Bluetooth receiver, a WiFi receiver, and the like. In some implementations, electronic readers include frictionless electronic readers that function to read identification for a user without active involvement form the user. For example, rather than requiring a user to position an access card key near the access credential input device or inserting the card key into the access credential input device, the access credential input device can read the user's identification by establishing a wireless communication session with an electronic device of the user (e.g., a user's mobile device, such as a laptop, wearable device, phone, watch, tablet, etc.).

In some implementations, access point state sensors (e.g., 155) include door contact sensors. In some implementations, access point state sensors (e.g., 155) include at least one of: door contact sensors, motion sensors, proximity sensors, heat sensors, pressure sensors, tactile sensors, switches (e.g., a reed switch, magnetic door switch, miniature snap-action switch, etc.), Hall Effect sensors, and weight sensors.

In some variations, the electronic access controller 151 is communicatively coupled one or more access switches. In some implementations, access switches include electronic door locks. In some implementations, access switches include electronic relays that, when activated, function to mechanically unlock a door.

In some variations, the electronic access controller 151 functions to activate an access switch responsive to data received from an access credential input device (e.g., 153) associated with the access switch. In some implementations, each access switch is coupled to an access credential input device, such that the coupled an access credential input device controls activation of the access switch. In some implementations, responsive to an access credential input device receiving identification information from a user, the access credential input device provides the identification information to the electronic access controller, which authenticates the identification information, and if the identification information is successfully authenticated, then the electronic access controller activates the access switch associated with the access credential input device to unlock (or open) a door.

Figure 3A:
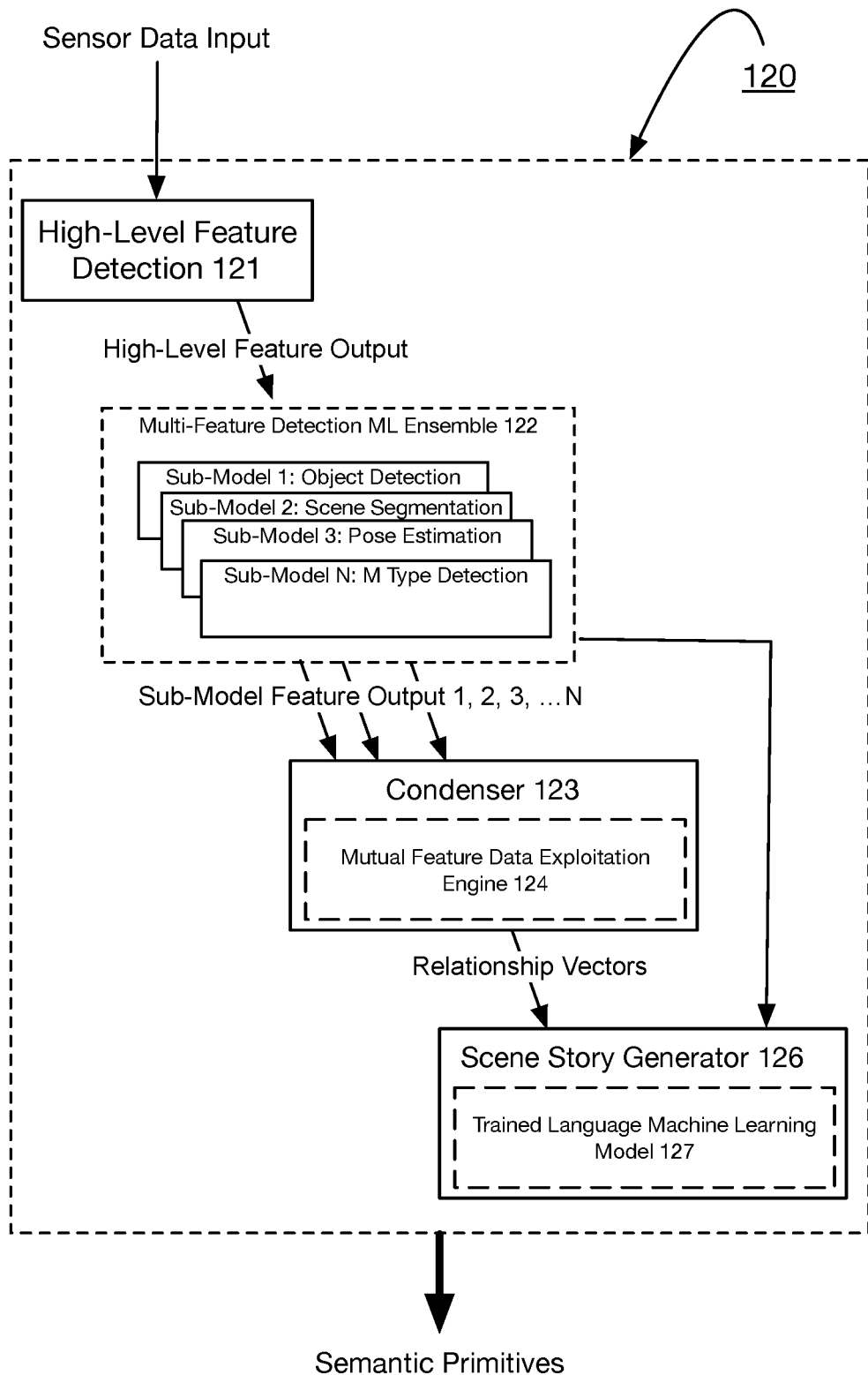
FIGS. 3A-3B, and 4 illustrate a comprehension system, in accordance with embodiments.
Figure 3B:
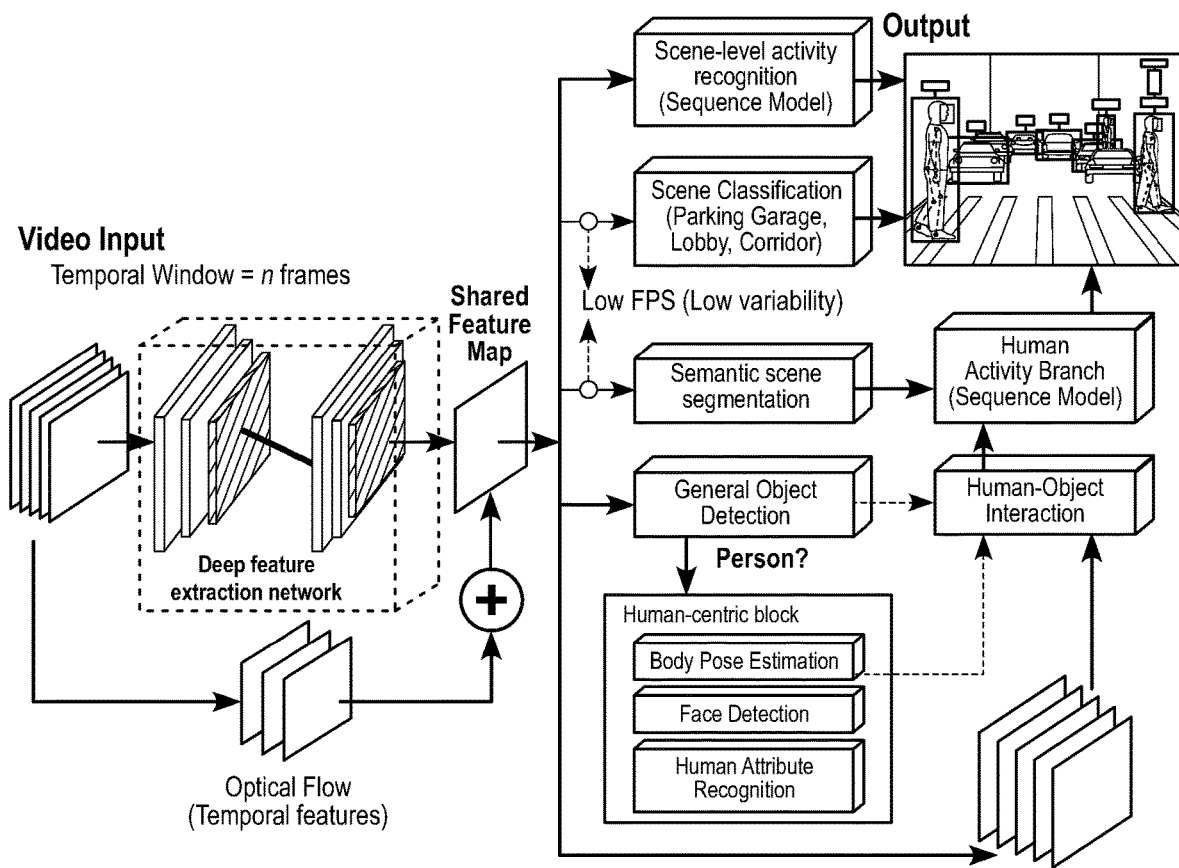

As shown in FIG. 3A, in some variations, the comprehension system 120 includes at least one of a high-level feature detection model 121, a multi-feature detection machine learning ensemble 122, a condenser 123, and a scene story generator 126. In some implementations, the condenser 123 includes a mutual feature data exploitation engine 124. In some implementations, the story generator includes a trained language machine learning model 127.

In some variations, the comprehension system 120 and the electronic access controller 151 are each communicatively coupled to the correlation engine 140. In some variations, each access point state sensor (e.g., 155) and each access credential input device (e.g., 153) functions to communicate access-related data to the electronic access controller 151. In some variations, the electronic access controller 151 functions to generate one or more access system primitives that identify access-related events. In some variations, the electronic access controller 151 functions to generate one or more access-system primitives by processing the access-related data received from at least one of an access point state sensor (e.g., 155) and an access credential input device (e.g., 153). In some variations, the electronic access controller 151 functions to provide generated access-system primitives to the correlation engine 140. In some variations, the comprehension system 120 functions to provide semantic primitives (generated from sensor data accessed by the system 120) to the correlation engine 140.

In some variations, the comprehension system 120 and the electronic access controller 151 transmit semantic primitives and access-system primitives (respectively) in parallel and in real-time to the correlation engine 140. In some variations, using the semantic primitives and the access-system primitives, the correlation engine 140 functions to perform a joint analysis of the semantic primitives and the access-system primitives to detect one or more contextual events (contextual access events). In some implementations, the correlation engine 140 generates contextual primitives identifying detected contextual events. In some variations, contextual events include indicators of compromise. In some variations, using the semantic primitives and the access-system primitives, the correlation engine 140 functions to perform a joint analysis of the semantic primitives and the access-system primitives to compute a unified timeline, as described herein.

In some variations, contextual events identify one or more correlations between semantic primitives and access-system primitives.

In some variations, the correlation engine 140 is implemented by one or more hardware computer servers implemented via a distributed networked system or the like (e.g., the cloud) and may function to execute one or more software modules that enable the detection of contextual events and optionally generation of a unified timeline.

Figure 2:
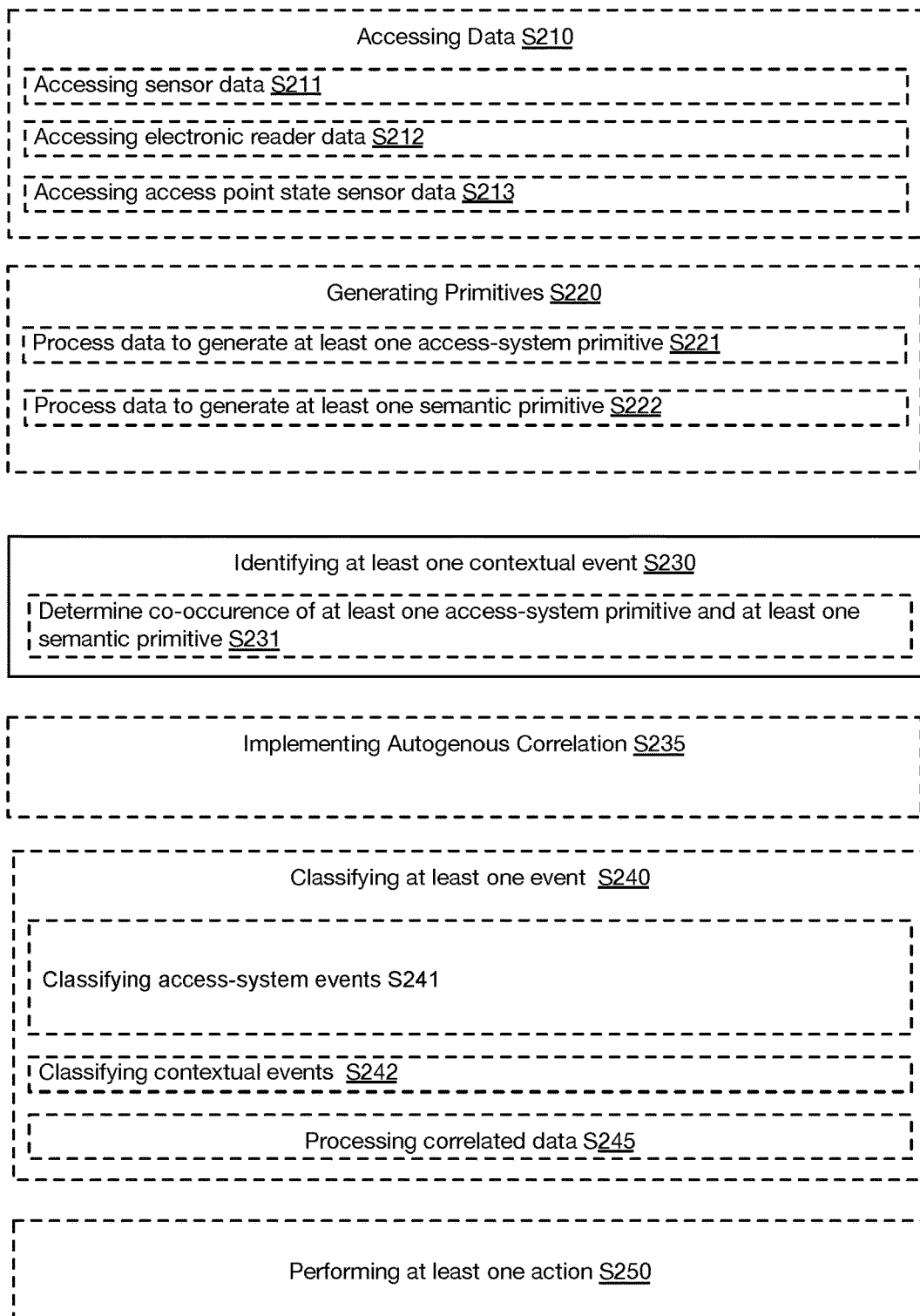
FIG. 2 illustrates a method, in accordance with embodiments

In some variations, the correlation engine 140 functions to classify security events detected by the electronic access controller 151 as one of a valid security event and a false security event (failure event) (e.g., S241 shown in FIG. 2). In some variations, the correlation engine 140 functions to classify security events detected by the electronic access controller 151 by correlating access-system primitives (generated by the access controller 151) with semantic primitives (generated by the comprehension system 120). In some implementations, the access controller 151 generates an access-system primitive for each security event detected by the access controller 151. In some implementations, a failure event indicates a failure of at least one of the access controller, 151, an access credential input device (e.g., 153), an access point state sensor (e.g., 155), a door access switch, an electronic lock, and an electronic door. In some implementations, the correlation engine 140 uses an access event classifier 143 to classify a security event detected by the access controller 151 as one of a valid security event and a false security event (failure event). In some implementations, the access event classifier 143 is a machine learning classifier. In some implementations, the access event classifier 143 is a rules-based classifier.

In some variations, the correlation engine 140 functions to identify one or more contextual events (represented as contextual primitives) by using a security event model (e.g., 142). In some variations, the correlation engine 140 functions to classify identified contextual primitives by using a contextual security event model (e.g., 142 that identifies contextual primitives classified as contextual security events) (e.g., S242 shown in FIG. 2). In some implementations, the contextual security event model 142 is a machine learning classifier. In some implementations, the contextual security event model 142 is a rules-based classifier. In some implementations, contextual security events include at least one of: "compromised credential", "terminated employee", "unusual access pattern by validly credentialed employee", "tailgating", and "piggybacking". However, contextual security events can include any suitable type of contextual security events include that can be detected by correlating semantic primitives with access-system primitives.

In some implementations, the correlation engine 140 performs any suitable machine learning process, including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the correlation engine 140 can additionally or alternatively leverage: a probabilistic module, heuristic module, deterministic module, or any other suitable module leveraging any other suitable computation method, machine learning method or combination thereof. However, any suitable machine learning approach can otherwise be incorporated in correlation engine 140. Further, any suitable model (e.g., machine learning, non-machine learning, etc.) can be used in generating scene comprehension data via the correlation engine 140.

Figure 4:
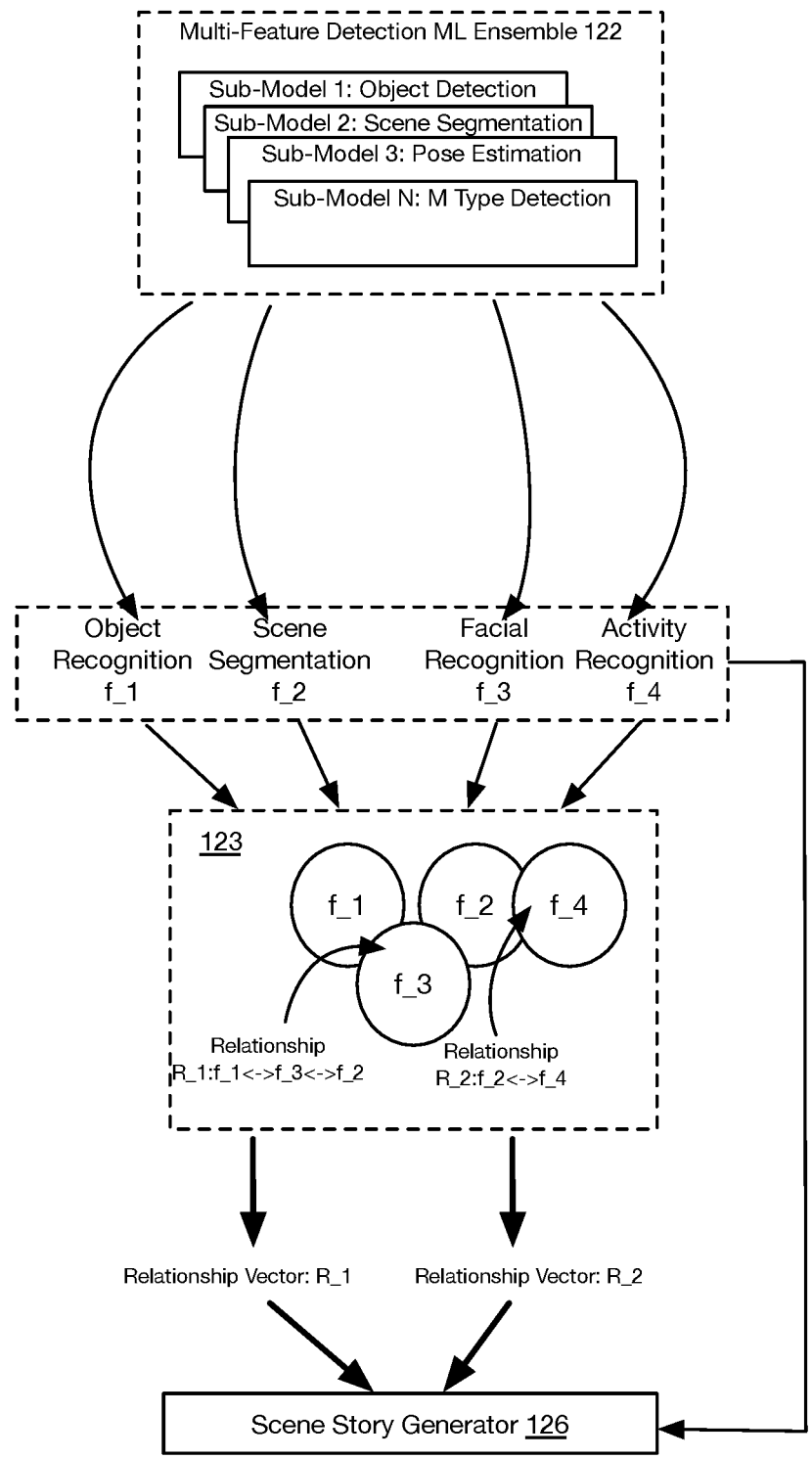

In some variations, the comprehension system 120 functions to collect sensor data (in any form) (e.g., image data) from the one or more sensor data sources (e.g., 110*a-c*) within the system 100. In some variations, the comprehension system 120 functions to implement a combined machine learning model core (e.g., a multi-feature detection machine learning ensemble 122) to detect relevant features within a scene defined by the collected sensor data. In some variations, the comprehension system 120 uses a condenser (e.g., 123) to form a composite of a plurality of feature outputs (e.g., f_1, f_2, f_3 . . . f_n) of the multiple sub-models of the combined model core. In some variations, from the composite, the system 120, using a mutual feature data exploitation engine (e.g., 124), functions to extract mutual/relationship data from overlapping segments of the composite and derives mutual/relationship vectors, as output (e.g., as shown in FIG. 4). In some variations, the comprehension system 120 passes the plurality of feature data outputs and the mutual/relationship vectors to a story generator (e.g., 126) that functions to use a trained machine learning model (e.g., 127) to generate one or more event descriptions for the sensor data.

In some variations, the sensor data processed through the system 120 includes live sensor data relating to events and/or circumstances captured in real-time and/or near real-time (e.g., within 0-5 minutes or the like) by one or more sensor data sources (e.g., live-feed video cameras). Correspondingly, in some variations, the system 120 functions to digest the live sensor data in real-time or near real-time to generate timely event or circumstance intelligence.

In some variations, the one or more sensor data sources (e.g., 110*a-c*) function to capture sensor data of one or more areas of interest. In some variations, the system 120 functions to collect image data. In some variations, the sensor data sources include a plurality of types of sensor data sources (e.g., image sensors, heat sensors, temperature sensors, motion sensors, etc.) each functioning to generate a different type of data. In some variations, the system 120 functions to capture any type or kind of observable data of an area or scene of interest (e.g., by using one or more sensor data sources) including, but not limited to, thermal or heat data, acoustical data, motion and/or vibration data, object depth data, and/or any suitable data that can be sensed. The area of interest may be a fixed area in which a field of sensing (e.g., field of vision for an image capturing sensor) of a sensor data source may be fixed. Additionally, or alternatively, the area of interest may be dynamic such that a field of sensing of a sensor data source may change continuously or periodically to capture different areas of interest (e.g., a rotating video camera). Thus, an area of interest may be dependent on a position and corresponding field of sensing of a sensor data source (e.g., 110*a-c*). In some variations, the sensor data sources 110*a-c* preferably include an image capturing system comprising one or more image capturing devices. In some variations, the image capturing devices include at least one of: video cameras, still image cameras, satellites, scanners, frame grabbers, and the like that function to capture (in real-time) at least one of analog video signals, digital video signals, analog still image signals, digital still image signals, and the like. In some variations, digital images may be captured or produced by other sensors (in addition to light-sensitive cameras) including, but not limited to, range sensors, tomography devices, radar, ultra-sonic cameras, and the like.

In some variations the one or more sensor data sources no function to capture sensor data and transmit the sensor data via a communication network (e.g., the Internet, LAN, WAN, GAN, short-range communication systems, Bluetooth, etc.) to the system 120. In some variations, the system 120 functions to access or pull the captured data from the one or more sensor data sources (e.g., 110*a-c*). In some variations, at least one of the sensor data sources (e.g., 110*a-c*) is in direct or operable communication with the system 120, such that live sensor data captured at the one or more sensor data sources (e.g., 110*a-c*) are fed directly into the one or more machine learning classifiers and feature detection models of system 120. Thus, in such variations, the live sensor data may not be stored (in a permanent or semi-permanent storage device) in advance of transmitting the live sensor data to the one or more processing modules and/or sub-systems of the system 120. A technical advantage achieved of such implementation include real-time or near real-time processing of an event or circumstance rather than post event processing, which may delay a suitable and timely response to an urgent occurrence.

In some embodiments, one or more parts or sub-systems of the system 100 may be implemented via an on-premise system or device and possibly, in combination with a cloud computing component of the system 100. In such embodiments, the one or more sensor data sources (e.g., 110*a-c*) may function to both capture live sensor data in real-time and feed the live sensor data to the on-premise system for generating intelligence data from the live sensor data. In such variations, the on-premise system may include one or more hardware computing servers executing one or more software modules for implementing the one or more sub-systems, processes, and methods of the system 100.

In some variations, the one or more sensor data sources (e.g., 110*a-c*) are configured to optimize scene coverage thereby minimizing blind spots in an observed area or area of interest and additionally, optimize overlapping coverage areas for potential areas of significant interest (e.g., a highly secure area, etc.). In some variations, the system 120 functions to process together overlapping sensor data from multiple sensor data sources (e.g., 110*a-c*) recording sensor data of a substantially same area (e.g., overlapping coverage areas) of interest. The sensor data in these areas of interest having overlapping coverage may enable the system 120 to generate increased quality event description data for a scene because of the multiple vantage points within the overlapping image data that may function to enable an increased or improved analysis of an event or circumstance using the additional detail and/or variances in data collected from the multiple image data sources.

In some variations, the system 120 functions to access additional event data sources including sensor data sources, news feed data sources, communication data sources, mobile communication device data (from users operating in an area of interest, etc.) and the like. The additional event data may be ingested by system 120 and used to augment the event description data for a scene.

In some variations, the comprehension system 120 functions to analyze and/or process sensor data input preferably originating from the one or more sensor data sources (e.g., 110*a-c*).

In some variations, the high-level feature detection model 121 is a high-level deep learning model (e.g., a convolutional neural network, etc.) that functions extract high-level features from the sensor data accessed by the comprehension system 120. In some variations, feature extraction performed by the high-level deep learning model (e.g., a convolutional neural network, etc.) includes at least tone of: edge/border detection, and other more abstract features with higher semantic information. In some variations, the high-level deep learning model functions to identify and extract coarse semantic information from the sensor data input from the one or more sensor data sources (e.g., 110*a-c*). In some variations, the high-level deep learning model implements an artificial neural network and functions to extract broad scene level data (and may optionally generate descriptive metadata tags, such as outdoor, street, traffic, raining, and the like for each of the distinctly identified features).

In some variations, the multi-feature detection machine learning ensemble 122 includes a plurality of sub-machine learning models, each functioning to perform a distinct feature detection and/or classification of features. In some variations, the plurality of sub-machine learning models functions to perform distinct feature detection tasks that include, but are not limited to: pose estimation, object detection, facial recognition, scene segmentation, object attribute detection, activity recognition, identification of an object (e.g., person ID, vehicle, ID, fingerprint ID, etc.), motion analysis (e.g., tracking, optical flow, etc.), and the like. In some variations, at least one of the sub-models uses the high-level features extracted by the high-level deep learning model to generate a vector in an n-dimensional hyperspace. In some implementations, at least one of the sub-models uses the high-level features extracted by the high-level deep learning model to generate a vector in an n-dimensional hyperspace for a particular computer vision task. In some variations, at least one of the sub-models extracts sensor data features directly from sensor data to generate a vector in an n-dimensional hyperspace. In some implementations, the system 120 functions to identify or classify any features of the accessed sensor data.

In some implementations, training a sub-model of the multi-feature detection machine learning ensemble 122 includes training at least one sub-model by using an output generated by at least one other sub-model of the ensemble 122.

In some implementations, training a sub-model of the multi-feature detection machine learning ensemble 122 includes training at least one sub-model to use high-level features generated by the high-level feature detection model 121 to generate semantic primitives. In some implementations, each sub-model of the ensemble 122 is trained with a same feature vector (e.g., a feature vector representative of output generated by the high-level feature detection model 121). By virtue of the foregoing, the machine learning ensemble 122 can generate semantic primitives by processing high-level features extracted from sensor data, without processing the raw sensor data. In this manner, performance may be improved, as compared with systems in which each model of an ensemble processes raw sensor data.

In some implementations, validating a sub-model of the multi-feature detection machine learning ensemble 122 includes validating at least one sub-model by using an output generated by at least one other sub-model of the ensemble 122.

In some implementations, training a sub-model of the multi-feature detection machine learning ensemble 122 includes simultaneously training at least two sub-models by using an output generated by at least one the sub-models being trained. In some implementations, simultaneously training includes tuning the feature vector output by the high-level feature extraction model 121 based on output generated by at least one sub-model of the ensemble 122. By tuning the high-level feature extraction model 121 with based on output generated by at least one sub-model of the ensemble 122, the high-level feature extraction model 121 can be tuned to reduce likelihood that the sub-models of the ensemble output invalid results after processing the feature vector output by the high-level feature extraction model 121. For example, in a case of an ensemble that includes an object detection model and a scene detection model, the high-level feature extraction model 121 can be tuned to reduce the likelihood that the object detection model detects a car and the scene detection model detects a sidewalk (indicating a car driving on the sidewalk) after processing of the high-level feature vector (assuming that a car driving on the sidewalk is most probably an incorrect detection result, rather than an unlikely event).

In some variations, training the high-level feature extraction model 121 includes training the model 121 to minimize invalid results of the ensemble 122. Such training can include processing sensor data of a training set to generate high-level feature vectors, processing the high-level feature vectors by using each model of the ensemble 122 to generate an combined ensemble output that identifies an output of each sub-model of the ensemble, and validating the trained model 121 by classifying each combined ensemble output as either valid or invalid.

In some variations, a subset and/or all of the sub-models of the multi-feature detection machine learning ensemble are operated in parallel. In some variations, the high-level feature vector from the high-level feature extraction model 121 is provided to each of the sub-models at the same or substantially the same time (e.g., within 0-5 seconds, etc.), such that a contemporaneous evaluation, classification, and/or feature detection may be performed simultaneously in each of the sub-models. In some variations, the sensor data from the one or more sensor data sources (e.g., 110*a-c*) are sourced to each of the sub-models at the same or substantially the same time (e.g., within 0-5 seconds, etc.), such that a contemporaneous evaluation, classification, and/or feature detection may be performed simultaneously in each of the sub-models.

Figure 6:
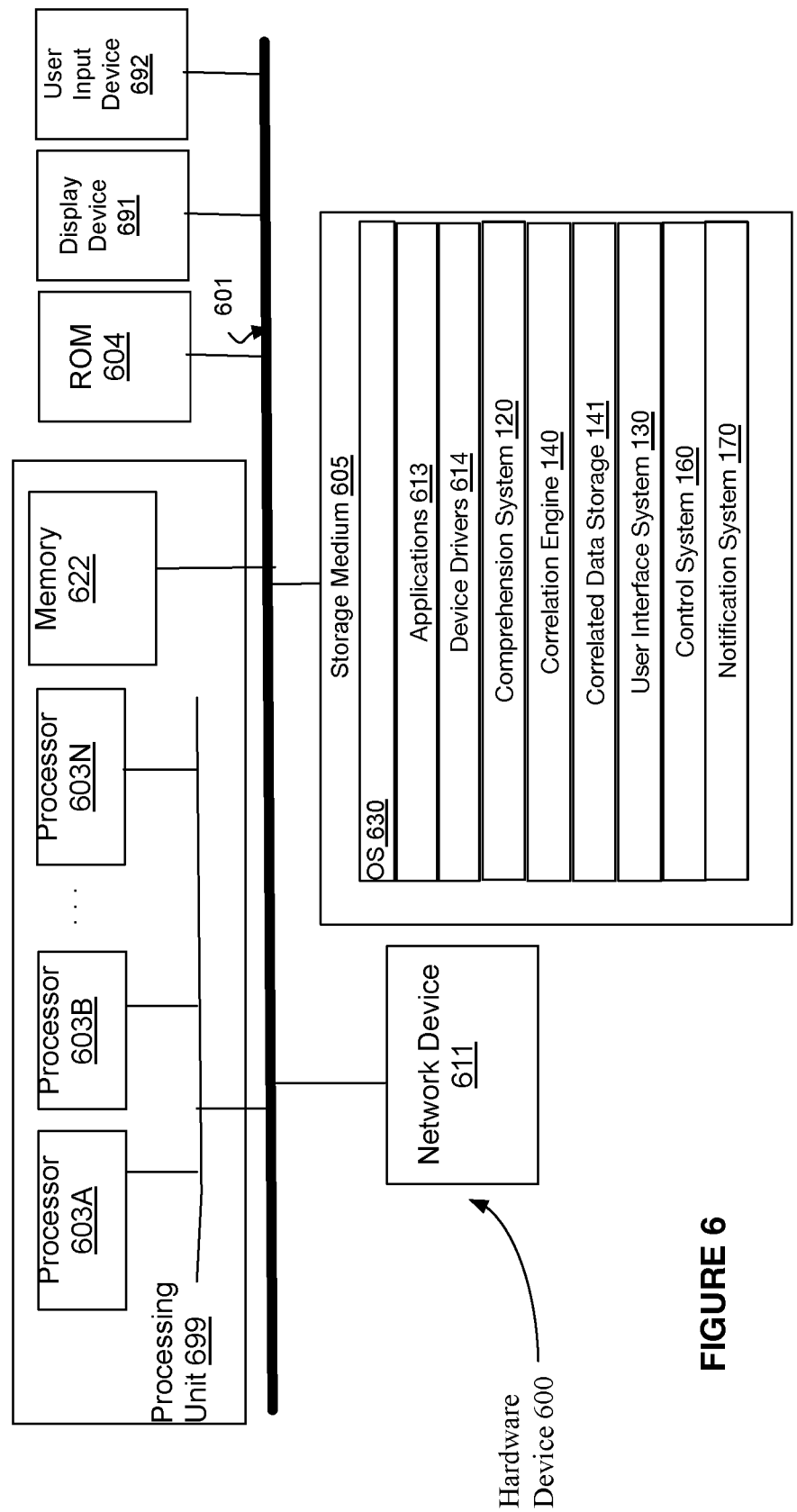
FIG. 6 illustrates a schematic of system architecture, in accordance with embodiments.

In some implementations, the comprehension system 120 is implemented by one or more computing servers having one or more computer processors (e.g., graphics processor units (GPU), tensor processing unit (TPU), central processing units (CPUs, MCUs, etc.), or a combination of web servers and private servers) that may function to implement one or more ensembles of machine learning models. In some embodiments, the comprehension system 120 is implemented by at least one hardware device 600, as shown in FIG. 6. In some embodiments, a storage medium (e.g., 605) of the comprehension system includes at least one of machine-executable instructions and corresponding data for at least one of a high-level feature detection model 121, a multi-feature detection machine learning ensemble 122, a condenser 123, a data exploitation engine 124, a scene story generator 126, and a trained language machine learning model 127.

In some variations, the ensemble of machine learning models includes multiple machine learning models that work together to exploit mutual information to provide accurate and useful feature detection and relationship vectors therefor. In some implementations, the comprehension system 120 functions to communicate via one or more wired or wireless communication networks. In some implementations, the comprehension system 120 utilizes input from various other data sources (e.g., outputs of system 100, system 100 derived knowledge data, external entity-maintained data, etc.) to continuously improve or accurately tune weightings associated with features of the one or more of the machine learning models of the comprehension system 120.

In some implementations, the comprehension system 120 performs any suitable machine learning process, including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 120 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 120. Further, any suitable model (e.g., machine learning, non-machine learning, etc.) can be used in generating scene comprehension data via system 120.

In some variations, the comprehension system 120 functions to process accessed sensor data to generate one or more semantic primitives describing the access sensor data processed by the comprehension system 120. In some implementations, the high-level deep learning model processes the accessed sensor data to extract the high-level features from the sensor data accessed by the comprehension system 120, and the multi-feature detection machine learning ensemble processes the high-level features to generate the one or more semantic primitives describing the access sensor data processed by the comprehension system 120. By virtue of the multi-feature detection machine learning ensemble processing the high-level features rather than the accessed sensor data, generation of the one-or-more semantic primitives can be performed in real-time. In some variations, the semantic primitives identify at least one of the following for the accessed sensor data: an activity, an object (e.g., person, car, box, backpack), a handheld object (e.g., knife, firearm, cellphone), a human-object interaction (e.g., holding, riding, opening), a scene element (e.g., fence, door, wall, zone), a human-scene interaction (e.g., loitering, falling, crowding), an object states (e.g., (door open"), and an object attribute (e.g., "red car"). In some variations, the semantic primitives identify a sensor that generates the accessed sensor data (e.g., "person detected by sensor 110*a*". In some variations, the semantic primitives identify access point sensed by the sensor (e.g., 110) that generates the accessed sensor data (e.g., "person detected at access point 154"). In some variations, the semantic primitives identify a site location sensed by the sensor (e.g., 110) that generates the accessed sensor data (e.g., "person detected at Building Entry 1").

In some variations, the comprehension system 120 functions to store sensor data in a sensor data storage (e.g., 128). In some variations, the stored sensor data includes at least one of sensor data received by the comprehension system 120 and primitives describing sensor data processed by the comprehension system 120.

In some variations, the system 100 includes a correlated data storage (e.g., 141) that stores correlated data. In some variations, correlated data includes contextual primitives generated by the correlation engine 140. In some variations, the correlated data includes correlated data for at least one region of a site (e.g., a building, campus, etc.).

Figure 5:
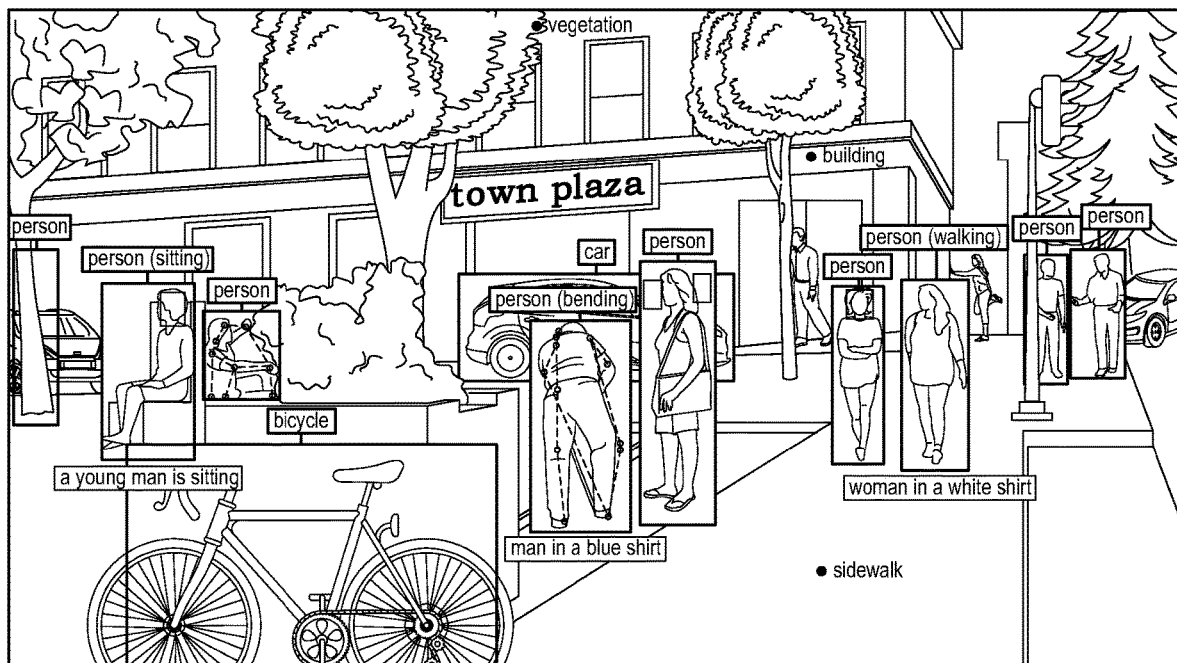
FIG. 5 illustrates a schematic of a scene provided by a user interface system, in accordance with embodiments.

In some variations, the user interface system 130 functions to receive outputs from at least one of the comprehension system 120, the correlation engine 140, and the electronic access controller (and optionally from one or more sensor data sources, 110-*a*-*c*). In some variations, the user interface system 130 functions to present data output by the correlation engine 140, such as data representing contextual primitives. In some implementations, the user interface system 130 functions to superimpose semantic data generated by the comprehension system 120 onto a displayed video stream, as shown in FIG. 5.

In some variations, the user interface system 130 functions to present sensor data from the one or more sensor data sources together with a scene description or scene story of the sensor data. In some variations, a scene description is presented by the user interface system 130 only when an event of interest (e.g., a predetermined event type, etc.) is detected within a scene. Accordingly, based on the detection of the event or circumstance, the system 100 may function to generate a scene description and/or scene story to detail the event or circumstance. Preferably, the sensor data comprises video data and the scene description or scene story may be superimposed over or augmented to the video data via a display of the user interface system 130, such that the scene description is presented at a same time as a video basis of the scene description. Additionally, or alternatively, the scene description or scene story may be presented in any suitable manner including visually, audibly, haptically, and the like.

In some variations, the user interface system 130 includes one or more computers having input/output systems including one or more of displays (e.g., video monitors), keyboards, mice, speakers, microphones, and the like. In some variations, the user interface system 130 includes a communication interface that enables the user interface system 130 to communicate over a communication network (e.g., the Internet) with the other components of system 100.

In some variations, the control system 160 functions to: control at least one system to perform an action (e.g., a threat response operation) responsive to detection of a contextual event by the correlation engine 140.

In some variations, the notification system 170 functions to: generate at least one alert responsive to detection of a contextual access event, and optionally provide the alert to a system (e.g., a user device, the user interface system 130, etc.).

In some implementations, the correlation engine 140 is implemented by one or more computing servers having one or more computer processors (e.g., graphics processor units (GPU), tensor processing unit (TPU), central processing units (CPUs, MCUs, etc.), or a combination of web servers and private servers) that may function to implement one or more ensembles of machine learning models. In some implementations, the correlation engine 140 and the comprehension system 120 are implemented in a same computing server; alternatively, the correlation engine 140 and the comprehension system 120 are implemented in separate computing servers. In some embodiments, the correlation engine 140 is implemented by at least one hardware device 600, as shown in FIG. 6. In some embodiments, a storage medium (e.g., 605) of the comprehension system includes at least one of machine-executable instructions and corresponding data for at least one of: the sensor data storage (e.g., 128), the control system (e.g., 160), the notification system (e.g., 170), and the user interface system (e.g., 130).

By way of example, FIG. 5 illustrates an exemplary schematic of an output of the system 100 that may be provided via the user interface system 100. In particular, the system 100 may generally function to identify and display one or more labels for each of the objects detected within a scene (a live scene). In some embodiments, as the labeled objects move within the scene, the system 100 may function to track the labelled objects and correspondingly, track the positioning of a label to an object to a positioned of the object associated with the label that is being tracked. Additionally, as shown in FIG. 5, the system 100 may function to augment the image data with descriptive data that identifies a circumstance, event, activity, and/or situation detected within a scene. For instance, as shown in FIG. 5, the system may function to explicitly call out or mark a person sitting in the left of the scene and further, label the person sitting with a higher level detail of the person and the associated activity (e.g., "a young man is sitting") being performed by the person in the scene. Similar labels and activity descriptions may be performed for any static or dynamic object and any human or non-human object identified in the scene.

2. Method

As shown in FIG. 2, a method 200 includes at least one of: accessing data S210, generating primitives S220; identifying at least one contextual event S230; classifying at least one event S240; and performing at least one action S250. In some variations, the method includes implementing autogeneous correlation S235. In some variations, the method includes processing correlated data S245.

In some implementations, the electronic access controller 151 performs at least a portion of S220. In some implementations, the sensor data comprehension system 120 performs at least a portion of S220. In some implementations, the correlation engine 140 performs at least one of S230, S235, S240, S245 and S250.

S210 can include accessing data from a plurality of data sources. In some implementations, the data is a data stream. In some implementations, S210 includes collecting the data in real-time. In some implementations, S210 includes accessing data from a plurality of types of data sources. In some implementations, S210 includes accessing sensor data from at least one sensor data source (e.g., 110*a*-*c*) S211. In some implementations, sensor data sources (e.g., 110*a*-*c*) include image data sources (e.g., video cameras).

In some implementations, S210 includes accessing access-credentials (and optionally related data) from at least one access credential input device (e.g., 153) S212. In some implementations, S210 includes, accessing access point state sensor data from at least one access point state sensor (e.g., 155).

In some implementations, the sensor data comprehension system 120 performs at least a portion of S210. In some implementations, the sensor data comprehension system 120 performs S211. In some implementations, electronic access controller 151 performs at least a portion of S210. In some implementations, the electronic access controller 151 performs S212. In some implementations, the electronic access controller 151 performs S213. In some implementations, the correlation engine 140 performs at least a portion of S210. In some implementations, the correlation engine 140 performs at least one of S211, S212 and S213.

In some implementations, S210 includes: collecting data streams from spatial intelligence sensors and/or an electronic access system.

In some implementations, S220 includes processing data to generate at least one access-system primitive S221. In some implementations, the electronic access controller 151 performs S221. In some implementations, S221 includes using the electronic access controller 151 to process data generated by at least one of an access credential input device (e.g., 153) and an access point state sensor (e.g., 155) to generate at least one access-system primitive. In some variations, access-system primitives include at least one of: "valid access sequence", "invalid access sequence", "receiving valid access credentials", "invalid access credentials", "granting access by the electronic system to the access point", "closing access", "preventing ingress through the access point", "door open", "door closed", and the like. In some variations, access-primitives include an access point identifier (e.g., "valid access sequence at access point 154", "invalid access sequence at access point 154", "receiving valid access credentials at access point 154", "invalid access credentials at access point 154", "granting access by the electronic system to the access point at access point 154", "closing access at access point 154", "preventing ingress through the access point at access point 154", "door open at access point 154", "door closed at access point 154", and the like.

In some variations, the access-system primitives identify a site location associated with the access-system primitive (e.g., "invalid access sequence at Building Entry 1").

In some implementations, data generated by an access credential input device (e.g., 153) includes at least one of access credentials, a location identifier, a building identifier, a door identifier, a valid credential notification, an invalid credential notification, an access time, and the like. In some implementations, data generated by an access point state sensor (e.g., 155) includes at least one of a location identifier, a building identifier, a door identifier, a door open time, a door close time, and the like.

In some variations, S221 includes the access controller 151 providing generated access-system primitives to the correlation engine 140. In this manner, the correlation engine 140 can process access-system primitives without performing specialized access system processes to transform raw data generated by an access credential input device (e.g., 153) or an access point state sensor (e.g., 155).

In some implementations, S220 includes processing sensor data to generate at least one semantic primitive S222. In some implementations, the sensor data comprehension system 120 performs S222. In some implementations, S222 includes using the sensor data comprehension system 120 to process data provided by at least one sensor data source 110a-c to generate at least one semantic primitive. In some variations, S222 includes the comprehension system 120 providing generated semantic primitives to the correlation engine 140. In this manner, the correlation engine 140 can process semantic primitives without processing raw sensor data provided by a sensor data source 110a-c.

In some implementations, S220 includes detecting a security event.

In some variations, S230 (identifying at least one contextual event) functions to simultaneously identify a plurality of contextual events in real-time based on access-system primitives and semantic primitives. In some implementations, a plurality of contextual events are simultaneously identified within a same region of the site in real-time. In some implementations, a plurality of contextual events are simultaneously identified across a plurality of regions of the site in real-time.

In some variations, S230 includes determining co-occurrence of at least one access-system primitive and at least one semantic primitive S231. In some implementations, the correlation engine 140 performs S231.

In some implementations, S230 includes: identifying correlations between data streams of an electronic access controller (e.g., 151) and a comprehension system (e.g., 120).

In some implementations, S240 (classifying at least one event) includes identifying an enhanced machine learning classification of an event identified at S230. In some implementations, S250 includes controlling a security response to a security event classified at S240.

In some variations, S240 includes S241 which functions to classify an access-system event identified by an electronic access controller (e.g., 151). In some variations, S241 includes classifying an access-system event as one of a valid security event and a system failure event S241 by using at least one semantic primitive (e.g., generated by a sensor data comprehension system, such as, for example, 120). In some variations, S241 includes classifying a contextual event (identified at S230) representing an access-system event (identified by an electronic access controller) as one of a valid security event and a system failure event S241. In some variations, S241 includes using the correlation engine 140 to classify an access-system event (or contextual event representing an access-system event) by using an access event classifier 143.

In some variations, S240 includes S242 which functions to classify a contextual event. In some variations, S242 includes using the correlation engine 140 to classify a contextual event by using a contextual security event model 142.

2.1 Collecting Data Streams

In some variations, S210 includes collecting data streams from sensor data sources (e.g., 110a-c) and/or an electronic access system that includes at least one of: an electronic access controller (e.g., 151), an access point state sensor (e.g., 155), and an access-credential input device (e.g., 153). In some variations S210 includes accessing data (e.g., receiving, collecting, etc.) from each of an electronic access system and sensor data sources. In some implementations, the electronic access system is associated with one or more access points of a facility, building, or other physically secured area. In some implementations, the sensor data sources include one or more image sensors (e.g., image data sources) capable of capturing still images and video images of areas associated with the one or more access points (e.g., 154). In some implementations, the sensor data sources are components of and/or integrated in a spatial intelligence and scene comprehension system, as described in U.S. Patent Application No. 62/670,616, which is incorporated herein in its entirety by this reference. In some implementations, the comprehension system (e.g., 120) is in direct and operable communication with each of the one or more image data sources (e.g., 110a-c), such that upon capture of image data of the one or more scenes, the comprehension system 120 has immediate and real-time access to the image data for real-time processing.

In some variations, S210 functions to access data streams from each of the electronic access system 151 and the sensor data sources 110a-c. In some variations, S210 functions to access the data streams in real-time and from each of the electronic access system 151 and the sensor data sources 110*a-c* in parallel. In some variations, the data stream accessed from the electronic access system 151 includes access data relating to access activities involving one or more of the access points (e.g., 154). In some variations, the data stream accessed from the sensor data sources 110*a-c* includes a real-time or near real-time stream of image data. In some variations, the stream of image data includes video image data that is useable as video input by the comprehension system 120. In some variations, S210 functions to access the access-system data and/or the image data indirectly from one or more storage mediums/storage systems (e.g., on-premise system) accessible to at least one of the comprehension system 120, the electronic access system 151 and the correlation system 140.

Additionally, or alternatively, S210 may function to augment the accessed streams with metadata including time stamp data, location and/or position data, system and/or sensor identification data, and the like.

2.2 S220

In some variations, S220 (generating primitives) includes detecting a security event. In some variations, S220 functions to identify a security event based one or more of the data streams accessed at S210. In some variations, S220 functions to assess one or more of the accessed data streams and identify whether the accessed data streams includes a security event. In some implementations, security events include at least one access event involving one or more of the access points (e.g., 154) in which a valid access attempt is not recognized by one or more of the electronic access system 151 and/or the comprehension system 120.

In some variations, S221 functions to judge or identify a valid access attempt in which a valid access sequence is recognized by an electronic access system (e.g., 151) associated with an access point (e.g., 154). In some variations, S221 includes generating at least one access-system primitive that represents an access sequence detected by the electronic access system 151. In some implementations, at least one access sequence is represented by a plurality of access-system primitives. In some variations, S221 includes generating at least one access-system primitive that identifies an access sequence as a valid access sequence. In some variations, S221 includes generating at least one access-system primitive that identifies an access sequence as an invalid access sequence.

In some implementations, a valid access sequence may include, at least, [1] receiving valid access credentials, at an input terminal (e.g., input device 153) at or near an access point (e.g., 154), from a user to one or more components of the electronic access system, [2] granting access by the electronic access controller (e.g., 151) to the access point (e.g., 154) thereby enabling ingress through the access point (e.g., opening a door, unlocking a door, etc.) to the user in response to the valid access credentials, and [3] closing access or preventing ingress through the access point when a predetermined condition is satisfied. The predetermined condition may be any suitable condition, including but not limited to, a success entry or passage through the access point, expiry or passage of a predetermined time (e.g., a timeout), a cancellation of a request to access the access point, and the like.

Thus, in some variations, S221 functions to generate an access-system primitive that identifies a security event if or when an access attempt or access sequence is not a recognized valid access event/valid access sequence or does not match a valid access sequence. In some variations, S221 functions to identify an access sequence from the accessed data streams and determine whether the identified access sequence matches or includes a valid access sequence or an invalid access sequence. In some variations, S221 functions to identify a security event if or when an access attempt or access sequence matches one or more security event archetypes. In some variations, access-system primitives include primitives for each defined security event archetype. In some implementations, the one or more security event archetypes relate to or include a plurality of known invalid access sequences that may function to trigger a security alert by the electronic access controller (e.g., 151). Accordingly, in some variations, S221 functions to identify whether the accessed data streams include one or more security event archetypes.

In some implementations, security archetypes includes at least one of: door held open (DHO); and door forced open (DFO).

In some implementations, a DHO archetype identifies an event in which an access point (e.g., 154) is maintained in an open state. In this first security event archetype, a valid access credential may be presented or provided to the electronic access controller (e.g., 151) by a user and therefore, proper access for ingress through the access point may have been granted, however, access through the access point may not have been disabled or closed after some predetermined condition, therefore triggering a security event.

In some implementations, a DFO archetype identifies an event in which an access point is opened or ingress is enabled through the access point without a valid access credential. In this second security event archetype, a valid access credential may not have been presented to or otherwise, is not detected by an electronic access controller (e.g., 151) associated with an access point, however, an opening of the access point is detected.

While in many cases, when a detected security event that is either of the DHO-type or DFO-type may not be valid security events, but rather, a failure mode of the electronic access system (which includes at least one of an access controller, an access credential input device, an access point state sensor, and an access switch). As discussed in greater detail below, the method 200 may function to detect instances in which a DHO-type or a DFO-type security event detected by the electronic access system is a false alert and a recognizable failure of the electronic access system to detect a hardware malfunction or otherwise, valid access event. Accordingly, in some embodiments, a detected security event may include a false security (failure) event type in which the electronic access system fails to accurately identify a sequence of events or activities associated with an access point as an invalid access sequence resulting from a failure or defect of the electronic access system or components associated with an access point (failure mode of electronic access system).

The following includes a few examples of failure modes of an electronic access system. As a first example failure mode of the electronic access system, in some circumstances, an electronic access system may detect a DHO security event if an access point is held or maintained in an opened state beyond some security threshold. However, this instance may be classified as a failure mode of the electronic access system if the comprehension system 120 detects that the access point (e.g., 154) is held opened by validly credentialed user or otherwise, a validly credentialed user is positioned proximate to the access point and may be enabling the access through the access point. In such example, the method 200 may function to cancel or mask a DHO security alert by the electronic access system. A similar cancellation of a DHO may be made if an incidental obstruction of the door occurs by an object or the like that prevents the access point or door from transitioning to a closed state.

As a second example failure mode of the electronic access system, in some instances, an electronic access system may function to detect a DFO security event if no valid access credentials are presented to an electronic access reader and a door contact sensor or the like reports the access point being in an open state. However, this instance may be classified as a failure mode if the comprehension system 120 detects that no user or person traversed the access point. In such example, the method 200 may function to classify the security event as a hardware malfunction or the like and cancel or mask a DFO security alert by the electronic access system. One example of a hardware malfunction may include an underdamped door or access point system in which the door may bounce into an open state (because of HVAC system or other pressure systems acting on the door) without being manipulated by a user.

2.3 S230

S230 functions to identify at least one contextual event. In some variations, identifying at least one contextual event includes identifying correlations between data streams of the electronic access system 151 and data streams of the comprehension system 120.

In some variations, S230 includes accessing a stream of access-system primitives (e.g., generated at S221) and a stream of semantic primitives (e.g., generated at S222). In some implementations, the access controller 151 provides the stream of access-system primitives to the correlation engine 140 and the comprehension system 120 provides the semantic primitives to the correlation engine 140. In some implementations, the access-primitives and the semantic primitives are streamed to the correlation engine 140 in real-time. In some implementations, the correlation engine 140 identifies correlations between received access-system primitives and received semantic primitives. In some variations, identifying correlations between received access-system primitives and received semantic primitives includes determining co-occurrence of at least one access-system primitives and at least one semantic primitives.

In some variations, the correlation engine 140 identifies correlations between received access-system primitives and received semantic primitives based on access point. In some variations, S230 includes the correlation engine 140 identifying access-system primitives for an access point (e.g., 154), and identifying semantic primitives related to the access point. In some implementations, the correlation engine 140 identifies an access-system primitive for an access point (e.g., 154) based on an access point identifier associated with (or identified by) the access-system primitive. In some implementations, the access-system primitive identifies the access point (e.g., "invalid access sequence at Access Point 154"). In some implementations, the access controller 151 provides the access point identifier along with the access-system primitive (e.g., as metadata, packet data, stream data, header data, etc.). In some implementations, the correlation engine 140 identifies an access-system primitive for an access point (e.g., 154) based on a site location identifier associated with (or identified by) the access-system primitive. In some implementations, the access-system primitive identifies the site location (e.g., "invalid access sequence at Building Entrance 1"). In some implementations, the access controller 151 provides the site location identifier along with the access-system primitive (e.g., as metadata, packet data, stream data, header data, etc.). In some implementations, the correlation engine 140 determines the access point associated with an access-system primitive by comparing the identified site location for the access-system primitive with site data that identifies site locations for each access point of the site.

In some implementations, the correlation engine 140 identifies a semantic primitive for an access point (e.g., 154) based on a sensor identifier associated with (or identified by) the semantic primitive. In some implementations, the semantic primitive identifies the sensor (e.g., "person detected by Sensor 110*a*"). In some implementations, the comprehension system provides the sensor identifier along with the semantic primitive (e.g., as metadata, packet data, stream data, header data, etc.). In some implementations, the correlation engine 140 determines the access point associated with a semantic primitive by comparing the sensor identifier for the semantic primitive with site data that identifies access points sensed by each sensor of the site. For example, such site data can identify access points that are included in image data generated by a given image sensor (e.g., video camera). In some implementations, during system configuration for a site, a data structure is populated that identifies sensor data sources (e.g., 110*a-c*) included in the site, access points included in the site, and information associating sensor data sources with access points. Using such a data structure, the correlation engine 140 can identify semantic primitives related to access-system primitives given sensor identifiers for the semantic primitives and access point identifiers for the access-system primitives.

In some implementations, the correlation engine 140 identifies a semantic primitive for an access point (e.g., 154) based on an access point identifier associated with (or identified by) the semantic primitive. In some implementations, the semantic primitive identifies the access point (e.g., "person detected at Access Point 154"). In some implementations, the comprehension system 120 provides the access point identifier along with the semantic primitive (e.g., as metadata, packet data, stream data, header data, etc.).

In some implementations, the correlation engine 140 identifies a semantic primitive for an access point (e.g., 154) based on a site location identifier associated with (or identified by) the semantic primitive. In some implementations, the semantic primitive identifies the site location (e.g., "person detected at Building Entrance 1"). In some implementations, the comprehension system provides the site location identifier along with the semantic primitive (e.g., as metadata, packet data, stream data, header data, etc.). In some implementations, the correlation engine 140 determines the access point by associated with a semantic primitive by comparing the identified site location for the semantic primitive with site data that identifies site locations for each access point of the site.

In some variations, the correlation engine 140 identifies correlations between received access-system primitives and received semantic primitives based on access point and time. In some variations, S230 includes the correlation engine 140 identifying access-system primitives for an access point (e.g., 154), and identifying semantic primitives related to the access point during a time window that includes a time associated with the access-system primitives.

In some variations, correlations between access-system primitives and semantic primitives include any type or kind of correlation including time-based correlations, event-based correlations, some combination thereof, and/or the like.

In some variations, identifying and/or constructing the correlations in S230 is triggered based on a detection of a security event (e.g., an access-system primitive identifying a security event) (e.g., at S220). In some variations, when a security event is detected at or by an electronic access system 151, the correlation engine 140 identifies correlations between access-system primitives generated by the access-system 151 and the semantic primitives generated by the comprehension system 120.

In some variations, in identifying and/or constructing the correlations, S230 functions to sample streams of access-system primitives generated by the access-system 151 and the semantic primitives generated by the comprehension system 120 at a time contemporaneous with a detected security event and construct the correlations between the samples of each of the access-system primitives and the semantic primitives. That is, in some implementations, S230 functions to collect a sample size from each of the disparate primitive streams that is a sufficient size, such that the collected sample from each of the primitive streams includes details of the security event. For instance, a first data sample collected from the data stream of the electronic access controller 151 may include primitives related to an access sequence giving rise to the security event and a second data sample collected from the data stream of the comprehension system 120 may include primitives related to video data regarding circumstances giving rise to the same security event.

Additionally, or alternatively, in some embodiments, S230 may function to identify and/or construct the correlations in a continuous manner. In such embodiments, S230 preferably functions to identify or construct correlations continuously and/or periodically without or even in the absence of a specific triggering event, such as a detection of a security event.

In some variations, in which the sensor data sources 110a-c include one or more video cameras or any suitable sensor capable of capturing continuous or action frames, S230 functions to identify or construct a correlation based on a relationship between a location or position of the access point (e.g., 154) and one or more positions or locations of the one or more video cameras (e.g., 110) (e.g., coupled to the comprehension system 120). In some variations, S230 functions to identify or construct a correlation by first mapping a position or a location of the access point (e.g., 154) to the one or more video cameras (e.g., 110a-c) located or positioned at or positioned proximate to the access point (e.g., 154) and having a field-of-sensing (e.g., field-of-view) that includes at least part of the access point (e.g., 154) in a scene. Accordingly, in some implementations, once the access point (e.g., 154) is mapped to the one or more collocated or proximate video cameras (e.g. 110), S230 functions to use the comprehension system 120 to identify semantic primitives generated from data produced by the one or more cameras, and construct the correlation between the identified semantic primitives of the collocated or proximate video cameras and the access-system primitives generated by the electronic access controller 151 for the access point (e.g., 154).

In some variations, S230 functions to construct a unified event timeline based on the data streams (of access-system primitives) from the electronic access controller 151 and the data streams (of semantic primitives) from the comprehension system 120. In some implementations, in isolation, each of the data streams from either the electronic access controller 151 or the comprehension system 120 is used by S230 to create a distinct timeline illustrating activities or events associated with the electronic access controller 151 at a given access point or associated with sensors of the comprehension system 120 at the given access point. The distinct timelines may be created based on metadata, such as time-stamp data, event or activity data, augmented with a record or log of the data streams from each of the electronic access controller 151 and the comprehension system 120.

Accordingly, in some implementations, using the distinct timelines for each of the electronic access controller 151 and the comprehension system 120, S230 functions to construct a unified event timeline that combines the distinct timeline for each of the electronic access controller 151 and the comprehension system 120 into a single unified (unitary) timeline that includes features (primitives) and/or data from both of the respective timelines. In some implementations, S230 functions to align primitives, events and/or activities of the distinct timelines such that there is a one-to-one (or a near one-to-one alignment) alignment between noticed or relevant activities or events in the timeline of the electronic access controller 151 and in the timeline of the comprehension system 120 thereby defining an event-based unified timeline. In some implementations, the noticed or relevant activities may relate to data points relating to one or more valid access events or sequences and/or one or more invalid access events or sequences giving rise to a security event.

In some implementations, S230 functions to align the two disparate timelines by aligning one or more time periods of the disparate timelines for each of the electronic access controller 151 and the comprehension system 120. Thus, in lieu of or in addition to an aligning of the disparate timelines based on noticed or relevant events, S230 may function to identify and align the time periods of each of the disparate timelines.

It shall be noted that while in some implementations S230 may function to construct or build a unified timeline based on the distinct (pre-constructed) timelines formed using the respective data streams (that include primitives) of the electronic access controller 151 and the comprehension system 120, S230 may additionally or alternatively construct a unified timeline using the raw data streams (that includes raw data used to generate the primitives) from each of the electronic access controller 151 and the comprehension system 120.

In some implementations, S230 functions to generate one or more graphical illustrations of the unified timeline (e.g., by using the user interface system 130) such that a user and/or administrator may visually inspect the unified timeline as well as operate to interact with the unified timeline for purposes of evaluating a detected or potential security event. In some implementations, S230 enables an administrator to select or manipulate segments of the unified timeline and/or isolate segments of the unified timeline to enable an exacting security or other analysis of the selected or isolated segment of the unified timeline.

In some implementations, a generation of a unified timeline by S230 is triggered or constructed automatically in response to detecting a security event (by the electronic access controller 151). In some implementations, S230 functions to continuously or periodically generate the unified timeline based on a continuous or periodic collection of data streams from the electronic access controller 151 and the comprehension system 120, even in the absence of a detected security event.

In some variations, S235 includes autogenous correlation (e.g., self-correlation) for detecting a potential security compromise of an access point or a potential security event using intelligence generated by a correlation engine (e.g., 140) associated with the method 200. In some implementations, S235 functions to implement one or more anomaly or outlier detection algorithms in combination with the machine learning-based correlations of the correlation engine (e.g., 140) to generate a contextual security event model (e.g., 142) that can be used by the correlation engine to detect one or more circumstances and/or activities that may not be detectable as security events by a traditional electronic access controller (e.g., 151).

In some implementations, autogenous correlation includes detecting novel security threats or otherwise, security threats typically undetectable by traditional electronic access systems.

In some implementations, S235 includes generating the model 142 by automatically performing autogenous correlation using data generated by the correlation engine 140.

In some implementations, S235 includes generating the model 143 by automatically performing autogenous correlation using data generated by the correlation engine 140. In some implementations, S235 includes generating the model 143 by performing one or more anomaly or outlier detection algorithms in combination with the machine learning-based correlations of the correlation engine (e.g., 140) to generate the model 143.

In some implementations, S235 includes generating a model (e.g., 142 or a sub-model of 142) that functions to detect a compromised credential of a valid user when the correlation engine (e.g., 140) identifies multiple access attempts to access points (e.g., 154) with a same user credentials at multiple distinct access points. In some implementations, if a timeframe and/or geographic distance between the multiple attempts are such that they are humanly impossible to achieve by a valid user, the model functions to detect a security event based the autogenously correlation of the multiple access attempts.

In some implementations, S235 includes generating a model (e.g., 142 or a sub-model of 142) that functions to detect a terminated employee when one or more access attempts is made with an invalid or expired access credentials and a terminated employee classification is made of the user making the attempt(s) based on facial recognition.

In some implementations, S235 includes generating a model (e.g., 142 or a sub-model of 142) that functions to detect a potential security threat based on an unusual access pattern to one or more access points by an otherwise validly credentialed employee. In some implementations, the model functions to identify or generate a historical access pattern for the user and use the historical access pattern to identify anomalous or outlier access attempts by the user that deviate from the historical access pattern beyond a predetermined threshold.

In some implementations, S235 includes generating a model (e.g., 142 or a sub-model of 142) that functions to detect tailgating and/or piggybacking by one or more users through an access point after a valid access credential is used to enable the access point for ingress by a credentialed user. This type of security threat may be recognized as a video-based DFO in which the comprehension system 120 generates semantic primitives that identify a tailgater accessing the access point without presenting a valid access credential and access-system primitives (e.g., generated by data from by a door contact sensor or the like) identify that the access point is in an opened state.

It shall be noted that autogenous correlations may be implemented by the method 200 to detect any type or kind of security threats, and thus, should not be limited to the above-detailed implementations. Additionally, while in some implementations, a security threat may be detected within a continuous timeframe or window, the method 200 may be able to detect security threats over multiple but related timeframes over a short or longer periods.

2.4 Security Event Classification and/or Verification

In some variations, S241, which functions to classify an access-system event, functions to classify the access-system event using an access event classifier 143. In some implementations, the access event classifier includes an ensemble of machine learning classification models that functions to identify one or more classifications for an event that is identified based on access-system primitives generated by the electronic access controller 151.

In some implementations, S241 functions to independently classify the detected access-system event using one or more machine learning classifiers and responsively, identify whether the detected access-system event is a valid or an invalid access-system event based on a classification label prescribed to the detected access-system event by the one or more machine learning classifiers.

In some implementations, S241 functions to generate a classification label for a detected access-system event using the ensemble of machine learning classification models and, based on one or more features extracted from a unified timeline of the data streams of the electronic access controller 151 and of the data streams of the comprehension system 120.

In some implementations, S241 functions to isolate one or more sections of the unified timeline that coordinate the data streams of both the electronic access controller 151 and the comprehension system 120 that capture or include data related to the detected access-system event. In some implementations, S241 functions to isolate the activities, circumstances, and data of the access-system event as independently captured by primitives generated by each of the electronic access controller 151 and the comprehension system 120.

In some implementations, S241 functions to isolate the one or more sections of the unified timeline using a windowing algorithm that defines or identifies a temporal window from the unified timeline that encompasses (all) data (primitives) relating to the detected access-system event provided by both of the electronic access controller 151 and the comprehension system 120. In some implementations, the temporal window (e.g., an analysis window) enables a focused analysis of the activities and/or data of the access-system event without unnecessarily requiring a full analysis of the entire unified timeline including segments of the unified timeline unrelated to the access-system event.

In some implementations, the temporal window includes a prior period that is before an occurrence of an invalid access sequence (e.g., the access-system event) to a subsequent period that is after the occurrence of the invalid access sequence giving rise to the access-system event. Thus, a beginning of the prior period and an ending of the subsequent period may function to define a total period or window of time for identifying and selecting the temporal window in the unified timeline.

In some implementations, S241 functions to define the temporal window based on a timestamp associated with a time of detection of the access-system event. In this some implementations, S241 functions to set or define the temporal window to encompass data within the unified timeline that is within a time radius from the timestamp associated with the detection of the access-system event by the electronic access controller 151. The time radius may be predefined or dynamic based on circumstances relating to the access-system event or based on the access-system event type. For instance, the time radius may be set longer than a standard time radius for a door-held-open access-system event type than for a door-forced-opened access-system event type.

While in some variations, the method 200 implements a windowing technique to capture data from the unified timeline for downstream analysis of the access-system event, it shall be noted that any suitable isolation or similar windowing technique may be used to collect a sample of data from the unified timeline for analyzing the access-system event data.

In some variations, S240 includes S245. In some variations, S241 includes S245. In some variations, S242 includes S245.

In some implementations, S245 includes providing correlation data generated by the correlation engine 140 as an input to the comprehension system 120, and the comprehension system 120 using the correlation data to generate at least one of a semantic primitive and a natural language scene description. In some implementations, S245 includes providing correlation data generated by the correlation engine 140 to a comprehension system separate from the system 120 (but similar to the comprehension system 120), providing semantic primitives generated by the correlation system 120 to the separate comprehension system, and the separate comprehension system using the received correlation data and semantic primitives to generate at least one of a semantic primitive and a natural language scene description.

In some implementations, semantic primitives and natural language scene descriptions generated by using the correlation data are provided to the correlation engine 140. In some implementations, the correlation engine 140 uses semantic primitives and natural language scene descriptions generated by using the correlation data to perform at least one of S241 (classify access-system events) and S242 (classify contextual events).

In some implementations, S245 includes: analyzing the temporal window. In some variations, S245 functions to apply or implement a windowing algorithm or the like that functions to extract features (e.g., a feature vector) from the temporal window and provide the extracted features as input into an artificially intelligent event detection and scene comprehension system or the like (e.g., system 120, or a system similar to 120 that is included in the correlation engine 140 or coupled to the correlation engine 140). For instance, if the temporal window includes video data capturing circumstances and scenes relating to the detected access-system event, S245 may function to extract features (correlation data) from the video data and provide the extracted features from the video data (correlation data) as input into the scene comprehension system (e.g., 120, or a separate scene comprehension system).

In some implementations, S245 functions to use the comprehension system (e.g., 120) to derive or generate a natural (or formal) language description of a scene involving the access-system event. In some implementations, S245 functions to use one or more machine learning classification models of the scene comprehension system (e.g., 120) to generate one or more classification labels based on the feature vector (correlation data) extracted from the temporal window. In some implementations, the one or more classification labels include classification labels that each map to a distinct access-system event archetype and/or one of a plurality of prospective failures modes of the electronic access system. In some implementations, the plurality of failure modes preferably include a plurality of predefined or recognized instances of failure of an electronic access system. In such instances of failure, the electronic access system may function to misidentify activities at an access point as a potential security event. The misidentification of the activities at an access point may be a result of hardware malfunctions of one or more components of the electronic access system, a misinterpretation of a valid access sequence or event, and/or the like.

In some variations, each of a plurality of machine learning models of the scene comprehension system (e.g., 120) may be specifically trained to detect one (or more) specific instances of failure of an electronic access system. In some implementations, S245 functions to use the scene comprehension system (e.g., 120) to generate one or more classification labels that map to one or more distinct failure modes of an electronic access system based on feature data extracted from a temporal window of a unified timeline.

2.5 Controlling a Security Response (Reconciling Security Event)

In some variations, S250, includes controlling a security response to at least one event classified at S240. In some variations, S250 functions to generate control instructions (e.g., by using control system 160) for responding to the event based on the one or more classification labels and/or natural language descriptions of the circumstances and/or activities of the event. In some implementations, the event is an access-system event detected by the electronic access controller 151. In some implementations, the event is detected by the correlation engine 140 (e.g., an event detected by the correlation engine 140 by correlating semantic primitives with access-system primitives).

In some implementations, S250 functions to validate or invalidate an access-system event detected by the electronic access controller 151 based on the one or more classification labels and/or natural language description of the circumstances relating to the access-system event. In this implementation, S250 functions to verify whether the one or more classification labels and/or the natural language description of the circumstances surrounding the access-system event are in line with a detected security event type. For instance, if a access-system event as detected by the electronic access controller 151 is a door-held-opened (DHO) security event, S250 may function to verify whether the one or more classification labels and/or natural language description produced by the scene comprehension system 120 match or correspond with the DHO access-system event. In such example, if S250 identifies at least one classification label identifying a DHO and/or a natural language description of the circumstances includes details relating to a door at the access point being held opened, then S250 may function to verify or validate the access-system event of the electronic access controller 151. Conversely, if no classification label or natural language description matches the detected access-system event, then S250 may function to invalidate the detected access-system event. In this manner, invalid access system-event notifications can be suppressed and or identified as access-system failures.

In some implementations, at least one of the user interface system 130 and the notification system 170 functions to identify validated access-system events. In some implementations, at least one of the user interface system 130 and the notification system 170 functions to identify invalid access-system events as potential access-system failures.

In the circumstances that S250 functions to invalidate the detected access-system event, S250 may additionally function to identify a failure mode of the electronic access system and generate control instructions for responding to and/or handling the detected access-system event. In some implementations, at least one of the user interface system 130 and the notification system 170 functions to identify the failure mode of the electronic access system. In some implementations, the control system 160 functions to generate control instructions for responding to and/or handling the detected access-system event.

In a first example, if the detected access-system event, such as a DHO or DFO, is accurately re-classified as a result of malfunctioning hardware of the electronic access system, S250 may function to generate control instructions for masking the detected access-system event as well as future access-system events produced by the electronic access controller 151 at a given access point with damaged or malfunctioning hardware. The generated control instructions, in such in example, may additionally include one or more conditions for resolving or stopping the masking of access-system events at the access point (e.g., a satisfactory repair or replacement ticket, etc.).

In a second example, if the detected access-system event is accurately re-classified as a result of a user with valid access credentials operating an access point associated with the access-system event, S250 may function to generate control instructions for dynamically adjusting a time threshold used by the electronic access controller 151 for identifying a DHO security event. For instance, if it is determined based on video intelligence data (e.g., classification labels, natural language description, etc.) that an access point is maintained in an open state by a user with valid access credentials for a valid purpose, then S250 may function to generate control instructions for extending the time threshold to a time t sufficient to enable the user to pass through and/or operate the access point without triggering an access-system event.

In some implementations, in the circumstances that S250 functions to validate or verify the detected access-system event, S250 functions to generate control instructions that allows for a standard security response to the detected access-system event.

In some embodiments, at least one of the systems 120, 130, 140, 160 and 170 is implemented as a single hardware device. In some embodiments, at least one of the systems 120, 130, 140, 160 and 170 is implemented as a plurality of hardware devices.

In some embodiments, a hardware device 600 implementing at least one of the systems 120, 130, 140, 160 and 170 includes a bus 601 that interfaces with the processors, the main memory 622 (e.g., a random access memory (RAM)), a read only memory (ROM) 604, a processor-readable storage medium 605, and a network device 611. In some embodiments, bus 601 interfaces with at least one of a display device 691 and a user input device 692.

In some embodiments, the processors 603A-603N include one or more of an ARM processor, an X86 processor, a GPU (Graphics Processing Unit), a tensor processing unit (TPU), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel processor.

The network adapter device 611 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the processor-readable storage medium 605 includes at least one of correlated data 141, sensor data 128, raw sensor data, access-system primitives, semantic primitives, raw access-system data, and machine-executable instructions. In some variations, the machine-executable instructions include instructions for at least one of an operating system 630, software programs 613, device drivers 614, the sensor data comprehension system 120, the correlation engine 140, the control system 160, the notification system 170 and the user interface system 130.

The system and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method, comprising:
    determining a set of access primitives based on a first set of signals from an access point state sensor;
    determining a set of authorization primitives based on a second set of signals from a security credentialing system;
    determining a set of semantic primitives based on a third set of signals from a camera system;
    determining a correlation between the set of access primitives, the set of semantic primitives, and the set of authorization primitives;
    determining a context classification based on the correlation; and
    based on the correlation, determining a security risk associated with the context classification.

2. The method of claim 1, wherein the access point state sensor comprises a door sensor.

3. The method of claim 1, wherein the context classification comprises tailgating.

4. The method of claim 1, wherein the security risk is determined using probabilistic methods.

5. The method of claim 1, wherein the security risk is determined using machine learning methods.

6. The method of claim 1, further comprising performing a security action in response to determining the security risk.

7. A system, comprising:
    a processing system configured to:
        determine a set of access primitives based on a first set of access signals from a sensor at an electronic access system;
        determine a set of authorization primitives based on a second set of signals from a security credentialing system;
        determine a set of semantic primitives based on a third set of signals from a camera system;
        determine a correlation between the set of access primitives, the set of authorization primitives, and the set of semantic primitives;
        determine a context classification based on the correlation; and
        based on the correlation, determine a security risk associated with the context classification.

8. The method of claim 7, wherein the sensor comprises a door sensor.

9. The method of claim 1, wherein the security credentialing system comprises an access credential input device at the electronic access system.

10. The method of claim 7, wherein the context classification comprises as at least one of a valid security event or a false security event.

11. The method of claim 10, wherein the security risk is presented at a user interface when the context classification comprises a valid security event.

12. The method of claim 10, wherein the security risk comprises at least one of a door held open event or a door forced open event.

13. The method of claim 10, wherein a false security event comprises a malfunction associated with the electronic access system.

14. The method of claim 7, wherein the processing system is remote from the camera system.

15. A method, comprising:
    determining a set of access primitives based on a first set of signals from an electronic access system;
    determining a set of semantic primitives based on a second set of signals from a camera system, wherein the semantic primitives identify a tailgater accessing an access point;
    determining a correlation between the set of access primitives and the set of semantic primitives;
    determining a context classification based on the correlation; and
    based on the correlation, determining a security risk associated with the context classification, wherein the security risk comprises tailgating.

16. The method of claim 15, wherein the electronic access system comprises a security credentialing system, wherein the access primitives identify that a valid access credential for the tailgater is not detected.

17. The method of claim 15, wherein the electronic access system comprises an access point state sensor, wherein the access primitives identify the access point in an open state.

18. The method of claim 15, wherein the security risk is determined in real-time.

19. The method of claim 15, wherein the semantic primitives are determined using computer vision methods.

* * * * *